United States Patent
Gansweidt

(10) Patent No.: US 7,735,427 B2
(45) Date of Patent: Jun. 15, 2010

(54) SHOCK ABSORBER

(75) Inventor: Michael Gansweidt, Braunschweig (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 12/232,166

(22) Filed: Sep. 11, 2008

(65) Prior Publication Data

US 2009/0065462 A1 Mar. 12, 2009

(30) Foreign Application Priority Data

Sep. 11, 2007 (EP) .................................. 07116138

(51) Int. Cl.
*B61D 15/06* (2006.01)
(52) U.S. Cl. ..................... 105/392.5; 105/396; 213/220; 213/221
(58) Field of Classification Search ............. 105/392.5, 105/396; 213/220–222; 296/187.03, 187.09; 293/133, 154
See application file for complete search history.

(56) References Cited

U.S. PATENT DOCUMENTS

| | | | | | |
|---|---|---|---|---|---|
| 3,968,862 | A | * | 7/1976 | Gorges et al. | 188/376 |
| 4,346,795 | A | * | 8/1982 | Herbert | 188/375 |
| 4,679,669 | A | * | 7/1987 | Kalb et al. | 188/375 |
| 5,597,055 | A | * | 1/1997 | Han et al. | 188/371 |
| 6,167,815 | B1 | * | 1/2001 | Werner et al. | 105/392.5 |
| 6,393,999 | B1 | * | 5/2002 | Schneider | 105/392.5 |
| 6,505,820 | B2 | * | 1/2003 | Sicking et al. | 256/13.1 |
| 6,561,105 | B2 | * | 5/2003 | Godin et al. | 105/396 |
| 7,111,827 | B2 | * | 9/2006 | Sicking et al. | 256/13.1 |
| 7,410,069 | B2 | * | 8/2008 | Hogbring et al. | 213/50 |
| 7,537,127 | B2 | * | 5/2009 | Hogbring | 213/62 R |
| 2007/0125739 | A1 | * | 6/2007 | Hogbring et al. | 213/75 R |
| 2007/0175851 | A1 | * | 8/2007 | Hogbring | 213/62 R |
| 2009/0065462 | A1 | * | 3/2009 | Gansweidt | 213/1 A |

FOREIGN PATENT DOCUMENTS

| | | | |
|---|---|---|---|
| DE | 1 530 223 A1 | | 8/1969 |
| EP | 1 247 716 A | | 10/2002 |
| EP | 1247716 A1 | * | 10/2002 |
| FR | 2 789 358 A | | 8/2000 |
| WO | WO 2005/102810 A1 | | 11/2005 |

* cited by examiner

*Primary Examiner*—S. Joseph Morano
*Assistant Examiner*—Jason C Smith
(74) *Attorney, Agent, or Firm*—Jean C. Edwards, Esq.; Akerman Senterfitt

(57) ABSTRACT

The invention relates to a shock absorber (100), in particular for use as an additional irreversible shock-absorbing stage together with a component for transferring force. In order to achieve the reliable dissipating of high impact energies, a shock absorber (100) comprising the following is indicated in accordance with the invention: a base plate (1); a force-transferring element (3) having a tensioning element (4); an energy-absorbing element in the form of a deformation tube (5) which is connected by a first end section to the base plate (1); and a connecting element (6) for the disengageable connecting of the force-transferring element (3) to a second end section of the deformation tube (5), wherein the connecting element (6) is pressed against the tensioning element (4) such that the deformation tube (5) is braced between the tensioning element (4) and the base plate (1) without play.

14 Claims, 15 Drawing Sheets

SHOCK ABSORBER

CROSS-REFERENCE TO RELATED APPLICATIONS

The present invention claims priority from European Patent Application No. 07 116 138.4, filed Sep. 11, 2007, the contents of which are herein incorporated by reference in their entirety.

BACKGROUND OF THE INVENTION

1. Field of the Invention

The present invention relates to a shock absorber, including for use as an additional irreversible shock-absorbing stage together with a component for transferring force.

2. Description of the Related Art

To protect the outer hull of a ship against damage when maneuvering in a port or when anchoring at a wharf, it is known to make use of so-called fenders. Normally, a fender acting as a protective body is thereby positioned between the ship and the wharf such that it serves as a shock absorber on the one hand and, on the other, as a spacer so that the hull is not chafed. Independently devised fenders are usually used for larger ships, these being a component of the wharfage facility. Such fenders designed as components of a wharfage installation can have a certain degree of elasticity so that up to a certain extent they can also act along with the ship's movements when docking or in swells.

When the elastic damping capacity of fenders employed as such is exceeded, however, the risk arises of the ship's hull being damaged since when a ship for example strikes undamped against a wharf, the resultant impact energy acts undampened on the ship's hull. In order to prevent damage to the hull of the ship in this scenario, it is conceivable to provide an irreversibly-designed shock absorber which is activated when the damping capacity of the fender employed is exceeded and then absorbs at least a portion of the resulting impact energy, respectively converts it into the work of deformation and heat.

The damping of impact forces and the effective absorbing of impact energy resulting from an impact is a general problem, particularly with moving objects, when due to the mass of the object, high kinetic energies which are to be absorbed in a defined manner pursuant a predictable sequence of events need to be factored in.

This applies not only to ships such as oil tankers, for which wharfage facilities provide specific impact protection components, but also railborne vehicles. Buffer stops are known from rail technology, for example, which serve to terminate a track or a dead-end track of a railroad line with the intention of preventing a rail vehicle or a railcar from traveling beyond the end of the track. Buffers stops are usually configured so as to absorb as much energy from the moving rail vehicle as possible so that the rail vehicle remains as undamaged as possible. In the process, a buffer stop can be deformed or destroyed.

Shock absorbers can, however, also take the form of bumpers. These relate to structural elements on vehicles which, upon a collision or crash with a hard obstacle, absorb energy and thereby prevent damage to the vehicle or its cargo. Bumpers are particularly used on railborne vehicles (also referred to as "buffers" or "bumper bars"), whereby at least one or two constructional elements affixed to the front end are used which have the purpose of absorbing external compressive forces acting horizontally on the rail vehicle in its longitudinal direction. In line with this principle, rail vehicles can make use of two types of bumpers as shock absorbers, namely the so-called "single buffer" or "central buffer," in which the shock absorber is mounted in the longitudinal axis of the vehicle such that only one buffer is in each case centrally provided at the front end front beam of the rail vehicle, or the so-called "dual buffer" or "side buffer," in which two buffers are provided at the front end of the rail vehicle.

It is therefore known from the field of rail vehicle technology, for example, in the case of a multi-member railway vehicle, to equip the individual car bodies with so-called side buffers or UIC buffers when the car bodies are not connected together by a bogie and thus, the distance between the two coupled car bodies can vary during normal vehicle operation. These side buffers thereby serve to absorb and dampen impacts occurring during normal vehicle operation, for example when braking or bringing up to speed.

A telescoped structure can be used for a side buffer utilized on a rail vehicle which includes a buffer housing, a force-transferring member accommodated therein and a damping element, for example in the form of a spring or an elastomer body. With this type of structure, the buffer housing serves as a longitudinal guide and for the supporting of transverse forces while the damping element accommodated in the buffer housing serves in transferring force in the longitudinal direction.

With respect to the overall length as well as the buffer stroke; i.e., the spring travel of the damping element, this is standardized for certain vehicle categories by European regulations (e.g., the UIC 526 and 528 leaflets). The buffer stroke for a standardized UIC buffer, for example, is within a range of from 100 to 110 mm. After reaching maximum buffer stroke, the damping characteristic of the side buffer is exhausted, in consequence of which impact forces which exceed the characteristic operating load of the side buffer are routed to the vehicle undercarriage undampened.

While the impact forces which occur during normal operation of the vehicle, for example between individual car bodies of a multi-member vehicle, are absorbed by the regeneratively-designed damping element integrated in the side buffer, when the operating load of the side buffer is exceeded, however, for instance when the vehicle collides with an obstacle or when the vehicle is abruptly braked, the damping element integrated in the side buffer is usually unable to absorb the total resulting energy. The shock absorbance provided by the side buffer is thus, no longer integrated into the energy-absorbing concept of the vehicle as a whole such that the resulting impact forces are transmitted directly to the vehicle undercarriage. This subjects same to extreme loads with the potential to damage or even destroy same.

With the goal of preventing such damage, it is generally known in rail vehicle technology to design the guiding members of the plunger buffer such that after the maximum buffer stroke has been exhausted; i.e., after the guiding members of the side buffer (buffer sleeve and buffer rod) strike defined arresters, there is an additional contracting possibility by means of controlled deformation.

For example, the WO 2005/11 58 18 A1 printed publication describes a plunger buffer in which after the energy absorption provided by the regeneratively-designed damping element has been exhausted, predetermined break joints break away so as to thus increase the contracting length of the buffer. This increased contracting length allows the plastic deformation of the buffer housing upon overload so that this solution enables a destructive conversion of impact energy into the work of deformation and heat. The resulting deformation of the buffer housing which occurs upon overload thus, provides an additional protection against impacts to the shock absorbance provided by the side buffer.

Even if the side buffer known from this art can protect the vehicle undercarriage up to a certain degree from damage upon severe collisions, it is thereby not possible to adapt the additional shock absorber to specific applications. To do so would require commensurately designing the force-path characteristic for the deformation of the buffer housing so as to enable a predictable, defined absorption of energy. In particular, the known solution is unsuited for many applications since the maximum energy absorption achievable with the deformation of the buffer housing is often too low.

A further disadvantage can be seen in the fact that after the additional shock absorber has been activated, the entire side buffer needs to be replaced since the shock absorber is integrated into the side buffer and because due to the deformation of the buffer housing, the side buffer can no longer be used in normal vehicle operation.

The problem described above not only applies to shock absorbers designed in the form of a bumper; i.e., as a structural element mounted to the front end of a rail vehicle. In fact, a parallel can also be drawn between the disadvantages exemplified above with reference to a side buffer and shock absorbers which are a component of e.g., a buffer stop or a wharfage installation.

SUMMARY OF THE INVENTION

Based on the given problem as set forth, the invention is thus, based on the task of specifying a shock absorber with which high impact energies can be reliably dissipated on the one hand and, on the other, the force-path characteristic of the shock absorber can be adapted to individual applications as exactingly as possible.

Additionally, the shock absorber is to lend itself to retrofitting of for example, a front end of a railcar body, a front end of a buffer stop or a wharfage installation when no destructive shock absorber has previously been provided for these applications.

The task on which the invention is based is solved by a shock absorber, whereby in accordance with the invention, said shock absorber includes the following: a base plate; a force-transferring element having a tensioning element; an energy-absorbing element in the form of a deformation tube which is connected by a first end section to the base plate; and a connecting element for the disengageable connection of the force-transferring element to a second end section of the deformation tube, wherein the connecting element is pressed against the tensioning element such that the deformation tube is braced between the tensioning element and the base plate without play.

In one conceivable realization of the shock absorber, same can further include a support frame coupled to the base plate, wherein the deformation tube is accommodated in said support frame and the connecting element is designed to couple the force-transferring element to the support frame on the one side, and to the deformation tube on the other, and wherein the connecting element is preferably disengageably coupled to the support frame and pressed against the tensioning element when in its coupled state with the support frame such that the deformation tube is braced between the tensioning element and the base plate without play.

It is to be noted at this point that the invention is not only to be considered as providing additional shock absorbance for use with a side buffer. Rather, the shock absorber is suited in general for any end face of a supporting structure which serves to transfer the forces occurring during normal vehicle operation, such as for example, the end or contact surface of a wharfage, a buffer stop or a structural element for a vehicle. The structural element for a vehicle can in particular also be a crossbeam running for example in front of the front end of the car body, which is for example, configured—as described in printed publication DE 10 126 483 A1—as a bumper bar and fixed to the front end of a rail vehicle by means of side energy-absorbing elements and a base frame. This bumper bar can be arranged in the horizontal coupling plane, for example, and thereby serves to protect the front end of the car body from damage resulting from impacts.

Conceivable as a "structural force-transferring component" in the meaning of the present invention is thus, also a supporting structure extending transversely in front of the front end of the car body which is connected to the front end of the car body by means of side energy-absorbing elements. This supporting structure can further serve to support a coupling assembly on its side opposite the front end of the car body such as, for example, a central buffer coupling.

The solution according to the invention thus, relates to a shock absorber which can be used in conjunction with a structural force-transferring component and thus, serves in the event of a crash in converting the resulting impact energy into the work of deformation and heat by a defined plastic deformation of the deformation tube accommodated in the support frame. Making use of a deformation tube braced without play between the tensioning element and the base plate enables the activation force and the maximum amount of energy absorbable by the shock absorber to be predefined and be adapted to specific applications. Therefore, not only is the response characteristic predefinable, but also the sequence of events in the absorbing of energy.

Meant by the term "braced without play" as used herein is that the tensioning element is substantially rigid relative the base plate during the normal operation of the vehicle.

The inventive solution is particularly characterized by the shock absorber being configured such that it enables only the deformation of the deformation tube accommodated as the case may be in a support frame by plastic deformation after the shock absorber has been activated. Thus, after a crash, only this component needs to be replaced. To this end, the connecting element which connects the force-transferring element to the support frame on the one side and the deformation tube on the other is advantageously connected to the support frame so as to be detachable. The disengaging of the (detachable) connection between the connecting element and the support frame enables the deformation tube to be extracted from the shock absorber and replaced as needed. The connecting element is then subsequently recoupled to the deformation tube and/or the support frame as needed, such that same bears against the tensioning element and the (e.g., exchangeable) deformation tube is braced between the tensioning element and the base plate without play.

In particular, the solution according to the invention is thus, characterized by its doing away with the need to completely replace the structural components needed for the transfer of force after a crash.

The force-transferring element as used in the shock absorber in accordance with the present invention thereby serves as the interface between the force-transferring component and the shock absorber. Details on the force-transferring element will be specified in the following.

The shock absorber is preferably designed to transfer impact forces, wherein the force flow occurring upon a transfer of impact force runs through the force-transferring element, the tensioning element, the deformation tube and the base plate. The deformation tube is thereby to be designed so as to transfer substantially all of the energy ensuing from the transfer of impact force up to a predefinable characteristic impact force. After the predefinable characteristic impact force has been exceeded, the deformation tube is to absorb and dissipate at least a portion of the energy ensuing from the transfer of impact force by simultaneous plastic deformation, wherein during the plastic deformation of the deformation tube, the force-transferring element and the base plate move toward one another. By virtue of the force flow occurring in the transfer of impact forces in the longitudinal direction of the shock absorber running substantially completely through the elements including the deformation tube, this yields being able to precisely predefine the energy absorption of the deformation tube, and in particular, the deformation tube's characteristic activation force, by the design of said deformation tube.

Specifically, it would be conceivable to precisely predefine the flexural strength of the deformation tube, and thus, the deformation tube's characteristic activation force, by means of the wall thickness to the deformation tube and/or by making the appropriate selection of material. It is of course also conceivable, however, for only a portion of the force flow ensuing upon the transfer of impact forces in the longitudinal direction of the shock absorber to run through the deformation tube, whereby the remaining portion of the force flow is guided past the deformation tube by means of the appropriate devices such that this portion flows directly from the force-transferring element to the base plate; i.e., bypassing the deformation tube.

One preferred realization of the shock absorber provides for configuring the energy-absorbing element within the shock absorber as a deformation tube which plastically deforms upon the exceeding of the definable amount of energy transferred by the force flow through the shock absorber, preferably by cross-sectional expanding, and permits the relative movement of the force-transferring element relative the base plate. A shock absorber in which a deformation tube is employed as the energy-absorbing element is characterized by having a defined activation force with no spikes in the force. By virtue of this characteristic proceeding in substantially rectangular manner, maximum energy absorption is ensured after the shock absorber has been activated.

Particularly preferred is for the deformation tube to plastically deform along with simultaneous cross-sectional expanding upon activation of the shock absorber. Of course, however, energy absorption along with simultaneous cross-sectional decreasing of the deformation tube is also conceivable. Necessary hereto, however, would be pressing the deformation tube through a nozzle opening provided for example in the base plate of the shock absorber so that the plastically deformed energy-absorbing element would be expelled from the shock absorber. A deformation tube which plastically deforms upon activation of the shock absorber by cross-sectional expanding avoids this type of expelling of the deformed energy-absorbing element. For this reason, the preferred embodiment at the present time is the deformable energy-absorbing element with cross-sectional expansion.

The solution according to the invention provides for the deformation tube to be braced between the base plate and the tensioning element without play. This ensures a no-play integration of the deformation tube in the shock absorber, whereby with the appropriate initial load, the response characteristic of the deformation tube, and thus, the shock absorber, can also be influenced, respectively predefined. An example of a conceivable tensioning element would be a conterminous stage on one of the stop surfaces of the connecting element facing the base plate. Hereto, it would be conceivable to design said stage as an integral component of the force-transferring element.

Alternatively hereto, however, another viable solution encompasses designing the tensioning element as a separate component with respect to the force-transferring element and having for example, a tensioning element body be at least partly accommodated in the force-transferring element configured as a hollow body, wherein a conterminous stage is configured on said tensioning element body on one of the stop surfaces of the connecting element facing the base plate.

In one preferred realization of the invention solution, the end of the deformation tube opposite the base plate is preferably form-accommodated in a groove configured in the connecting element. The connecting element is thereby preferably connected to the support frame by a disengageable screw fitting and thus presses against the tensioning element such that the deformation tube is braced without play between the tensioning element and the base plate.

The connecting element not only serves to brace the deformation tube between the tensioning element and the base plate, but also assumes a longitudinal guide function when the deformation tube plastically deforms after the shock absorber is activated and the force-transferring element moves toward the base plate. To this end, the connecting element preferably includes a guide surface which directly adjoins or abuts the outer surface of the force-transferring element and which is designed to guide the movement of the force-transferring element relative the base plate in the axial direction of the shock absorber effected by the plastic deformation of the deformation tube after the shock absorber has been activated. Because the connecting element is also accorded a guiding function, this prevents any wedging or canting of the individual components of the shock absorber during the process of energy absorption. It is thus, possible to prevent "seizing" or wedging, in particular upon vertical or oblique load on the deformation tube; i.e., not fully axial, so as to in principle, provide reliable functioning of destructive energy absorption in a predefinable sequence of events.

As indicated above, the characteristic amount of energy transferable through the deformation tube for the activation of said deformation tube, the shock absorber respectively, when force is transferred by the force flow can be predefined by making the appropriate selection of wall thickness and material for the deformation tube. A particularly preferred realization of the shock absorber in accordance with the invention provides for the deformation tube to be in a material fit connection or positively locked by its base plate-side end to the base plate. A conceivable example for realizing this would be providing a corresponding groove in the base plate into which the deformation tube is inserted.

On the other hand, a deformation tube section should preferably be provided on the opposite end of the deformation tube which exhibits an expanded cross-section in comparison to a deformation tube section situated closer to the base plate. In this embodiment, the shock absorber is to additionally include a conical ring situated between the tensioning element and the deformation tube such that the deformation tube is braced by the conical ring between the tensioning element and the base plate. Said conical ring can be, for example, configured integrally with the tensioning element. It is, however, of course also conceivable for the conical ring to be configured as a separate component with respect to the tensioning element.

In principle, at least part of the base plate-side end section of the conical ring is to extend into the expanded section of the deformation tube and rest against the inner surface of said deformation tube.

The advantages obtainable with this embodiment include providing a deformation tube which is braced by the conical ring between the base plate and where the tensioning element yields a shock absorber which enables maximum energy absorption at the lowest possible space requirements. By utilizing a deformation tube which plastically deforms by cross-sectional expanding, it is in particular, not necessary to provide an additional space behind the shock absorber for expelling the plastically deformed deformation tube. On the other hand, by providing the conical ring between the tensioning element and the deformation tube, the embodiment also allows a very exact predefining of the sequence of events to ensue in the energy absorption process.

As stated above, at least part of the base plate-side end section of the conical ring is to extend into the deformation tube section already exhibiting an expanded cross-section prior to the activation of the shock absorber compared to the deformation tube section situated closer to the base plate. Since the conical ring extends at least partly into the expanded section of the deformation tube on the one hand and, on the other, the part of the conical ring extending into the expanded section of the deformation tube rests against the inner surface of said tube section, when the shock absorber is activated, meaning when the force-transferring element with the tensioning element moves relative the base plate and the deformation tube in a material fit connection or positively locked to the base plate toward said base plate, the base plate-side end of the conical ring runs along the inner surface of the (as of yet) non-expanded deformation tube section and thus, effects an axial guidance for the energy absorption.

Additionally to the guidance effected by the guide surface of the connecting element, the axial guidance effected by the conical ring prevents a canting of the tensioning element, the conical ring respectively, in the deformation tube upon the activation of the shock absorber so that the plastic deformation of the deformation tube (i.e., the plastic cross-sectional expanding of the deformation tube) ensues in a precisely predictable manner and the sequence of events to the energy absorption during a crash is altogether precisely predictable.

In the latter embodiment, it is conceivable for the conical ring and the tensioning element to be of integral configuration. Of course, however, it is also conceivable for the conical ring with the tensioning element, and specifically with the stage configured on said tensioning element abutting the stop surface of the connecting element facing the base plate, to be connected by means of by a form-fitting engagement or by a forced-locked connection.

One particularly preferred realization of the shock absorber according to the invention provides for the force-transferring element to include an impact plate on its side opposite the base plate, by which impact forces can be introduced to the force-transferring element and thus, to the shock absorber. Conceivable to this end would be for the impact plate to be directly connected to the force-transferring element so that impact forces are introduced directly from the impact plate to the shock absorber via the force-transferring element. This embodiment is characterized by the shock absorber being designed to not only transfer impact forces but also tractive forces. When tractive forces are transferred through the shock absorber, the ensuing force flow runs through the impact plate, the force-transferring element, the tensioning element, the connecting element and the support frame.

Another preferred realization of the shock absorber provides for same to further comprise an integrated buffer device. This buffer device preferably includes a guided buffer plunger having an impact plate in the force-transferring element at least partially configured as a hollow body, which is provided on the end of the shock absorber opposite the base plate, and by means of which the buffer device can introduce impact forces to the force-transferring element and to the shock absorber. Furthermore, the buffer device integrated into the shock absorber in this embodiment is to include a preferably regeneratively-designed energy-absorbing element accommodated inside said force-transferring element.

Thus, in this embodiment, the shock absorber is used in combination with a buffer device, normally used for example as a side buffer. This buffer device thereby serves as a regeneratively-designed shock absorber, in which the impact forces occurring for example between the individual car bodies of a multi-member vehicle during the normal operation of a vehicle are absorbed or damped. However, upon the operative load of the regeneratively-designed damping element (regeneratively-designed energy-absorbing element) integrated in the buffer device being exceeded, the shock absorber downstream the buffer device is activated, wherein the impact energy is converted into the work of deformation and heat by a defined plastic deformation of the deformation tube provided in the shock absorber. Thus, the regeneratively-configured damping element (spring device) as well as the other components of the shock absorber can be effectively protected against destruction or damage in the event of a crash.

Thus, with the inventive solution, after the shock absorber has been activated, the plastically-deformed deformation tube is the only structural element which needs to be replaced.

An example of a conceivable structure for the buffer device is described in printed publication EP 1 247 716 D1. Particularly preferred hereto is for the buffer device to be designed to absorb or dampen up to a predefinable characteristic impact force of the impact energy resulting from force acting on the impact plate along with a simultaneous longitudinal displacement of the buffer plunger toward the base plate, wherein after the buffer stroke of the buffer device has been exhausted, the force flow runs directly from the impact plate through the force-transferring element, the tensioning element, the deformation tube and the base plate.

One particularly preferred embodiment of the latter further development in which the shock absorber further includes an integrated buffer device, provides for the base plate of the shock absorber to be configured as a flange which is detachably mountable to a front end of a car body. This is thus, a combination of the inventive shock absorber with a buffer device, wherein said combination can be mounted to the front end of the car body by the flange-configured base plate. Accordingly, the shock absorber with its integrated buffer device can be mounted as one complete exchangeable module to the support frame or undercarriage of the car body. This is thus, a buffer device with shock absorber configured as a module; i.e., one complete exchangeable functional group. It is thereby possible to provide an additional shock absorber for e.g., a side buffer as a component for transferring force. When the shock absorber is used in combination with the buffer device, the buffer device thus, serves as a regeneratively-designed shock absorber in which the impact forces occurring for example, between the individual car bodies of a multi-member vehicle during the normal operation of the vehicle are absorbed or damped. However, upon the operative load of the regeneratively-designed damping element integrated in the buffer device being exceeded, the deformation tube of the shock absorber downstream the damping element is activated, wherein the impact energy is converted into the work of deformation and heat by a defined plastic deformation of said deformation tube.

The preceding described a particular embodiment in which the shock absorber further includes an integrated buffer device, wherein the shock absorber can be preferably detachably mounted to the front end of the car body by the flange-configured base plate. Within the scope of the present invention, however, it is of course also conceivable to not provide the shock absorber with an additional buffer device. For example, it is thus, in principle, conceivable for the force-transferring element of the shock absorber to include an impact plate on its side opposite the base plate via which impact forces can be introduced directly from said impact plate to the force-transferring element and thus, to the shock absorber. This shock absorber base plate can be configured as a flange which is preferably detachably mountable to the front end of the car body. This embodiment thus, relates to an additional (absolute) shock absorber which does not exhibit any damping properties and can be preferably retroactively mounted to the front end of a railcar body.

In another preferred realization, the shock absorber is integrated into a crossbeam running in front of the front end of the railcar body such that the support frame is at least partly accommodated in a recess provided in the crossbeam. This crossbeam running in front of the front end of the car body can, for example, be a bumper bar, as is described in the DE 10 126 483 A1 printed publication. The shock absorber thereby, serves as a lateral connecting element for the impact supporting structure of the car body. Should it integrate the above-described buffer device, the shock absorber can thereby also exhibit damping properties.

One preferred embodiment of the latter realization in which the shock absorber is integrated into a crossbeam running in front of the front end of the railcar body provides for the base plate and/or the support frame to be configured as an integral component of the crossbeam. In so doing, the force-transferring element is preferably to be connected by its side opposite the base plate with a supporting structure of the car body by means of a flange.

It is of course also conceivable for the crossbeam running in front of the front end of the car body not to be designed as a bumper bar in the sense of DE 10 126 483 A1, but rather as a supporting structure. A central buffer coupling, etc., can for example be arranged on the side of this supporting structure opposite the shock absorber.

BRIEF DESCRIPTION OF THE DRAWINGS

The following will make reference to the accompanying drawings in describing embodiments of the inventive shock absorber in greater detail.

DESCRIPTION OF THE INVENTION

Figure 1:
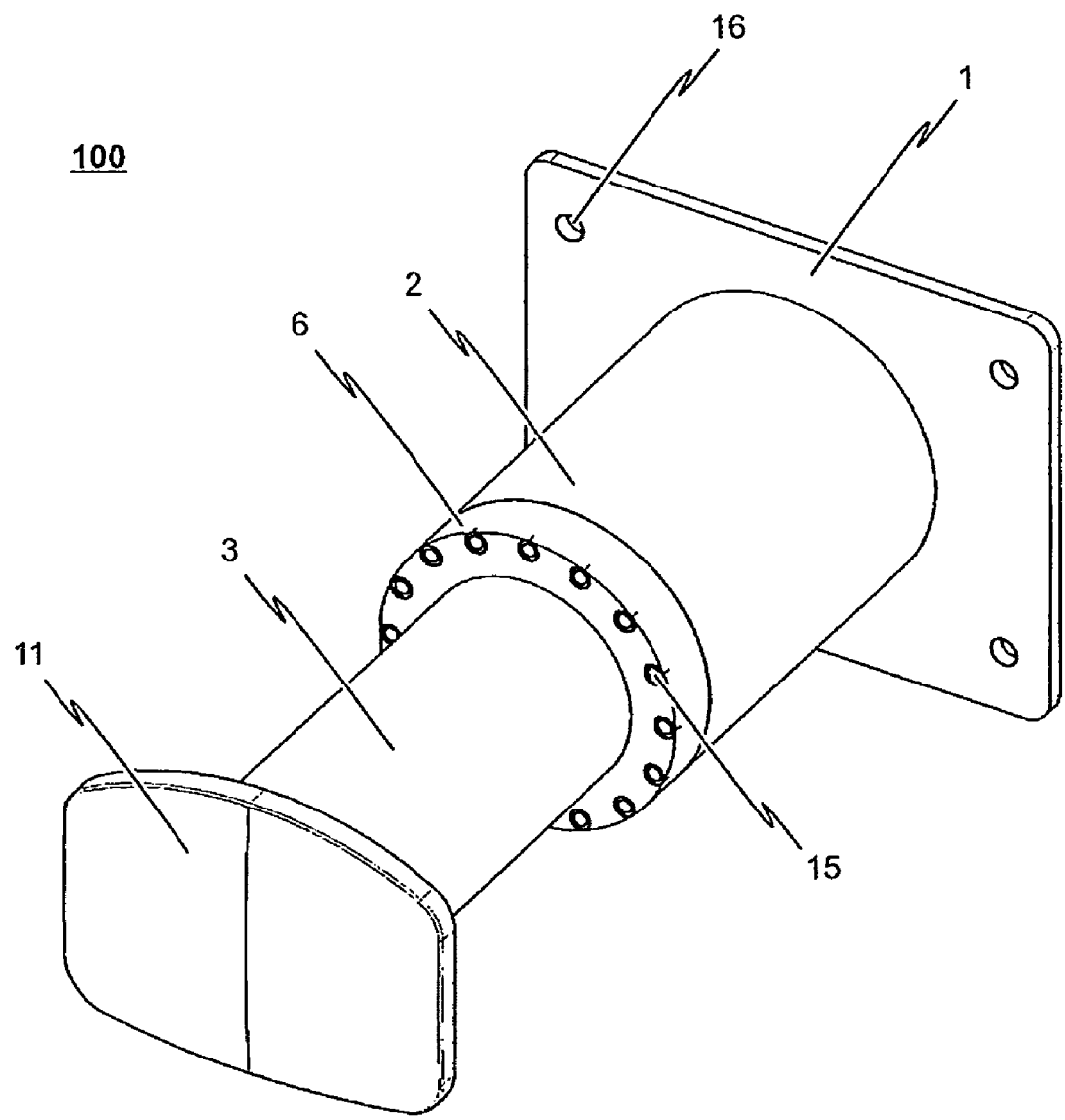
FIG. 1 is a perspective view of a shock absorber in accordance with a first embodiment of the invention, wherein the shock absorber is accorded no damping functions and is mountable to the front end of a supporting structure as a modular unit.
Figure 2:
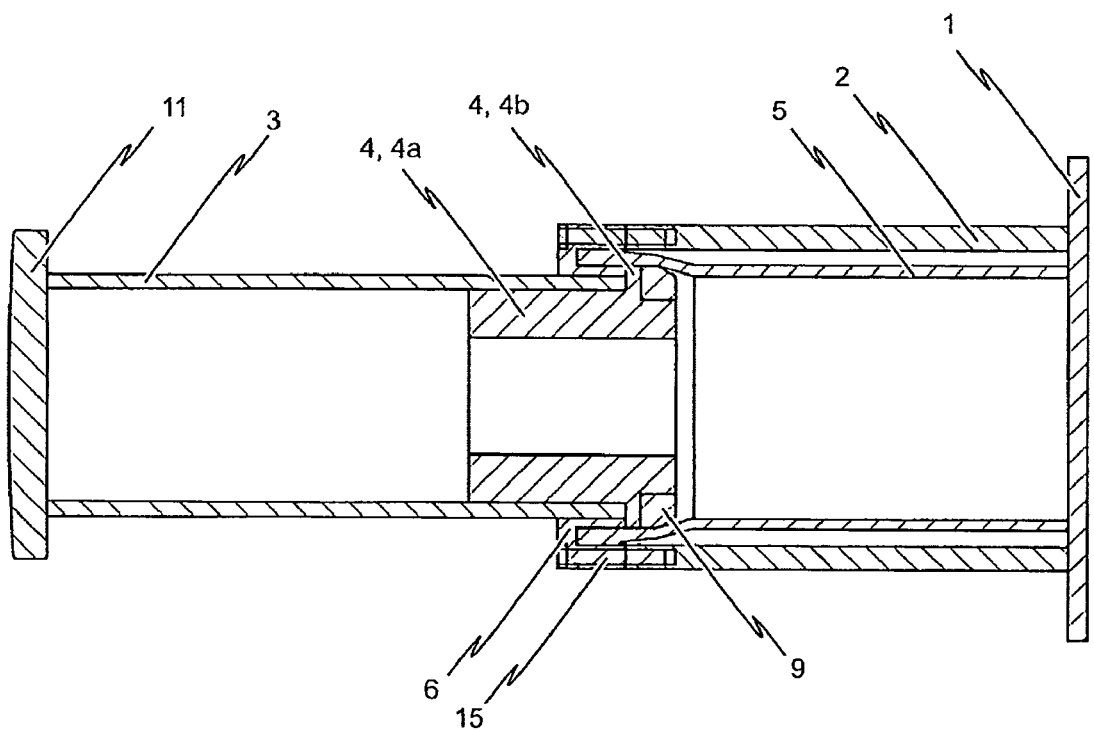
FIG. 2 is a side sectional view of the shock absorber according to FIG. 1.
Figure 5:
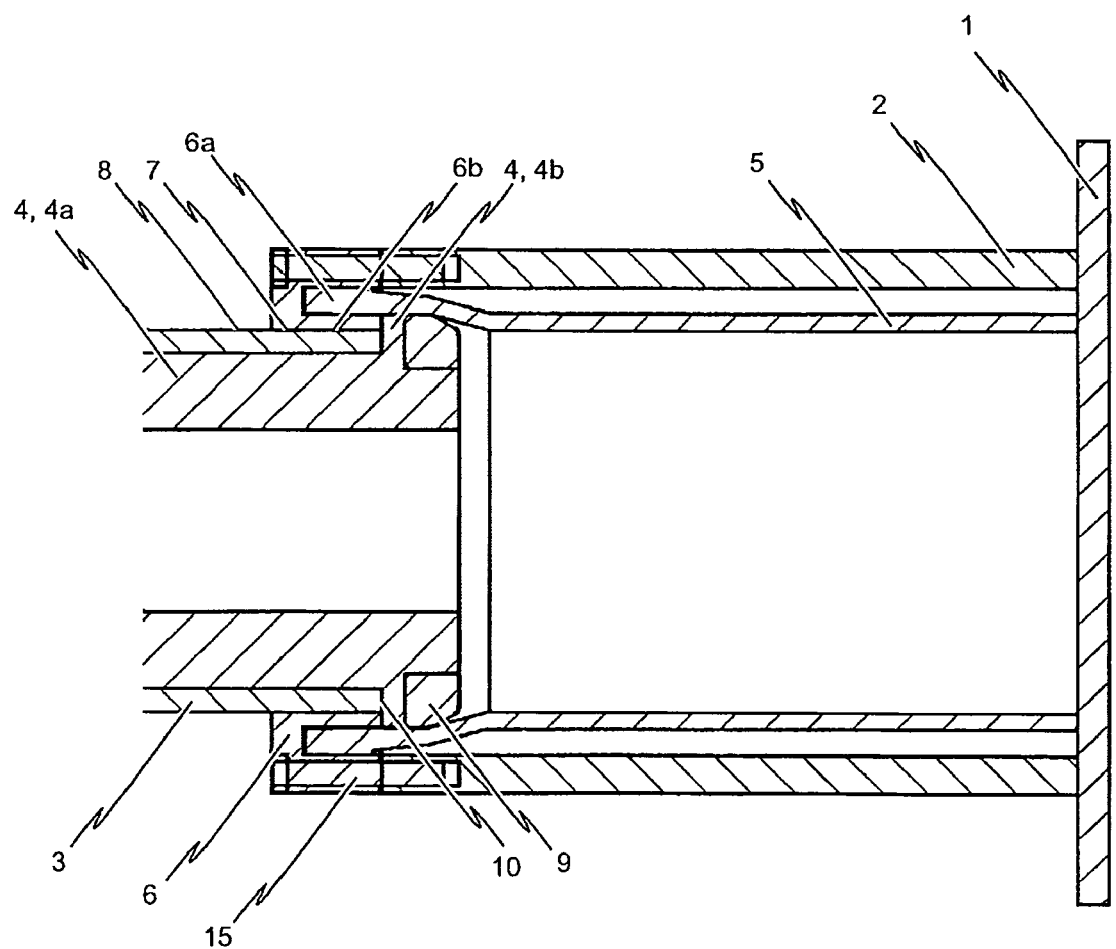
FIG. 5 is a detail sectional depiction of the deformation tube used in the shock absorber in accordance with the first and second embodiment.

FIG. 1 shows a perspective view of a first embodiment of the inventive shock absorber 100, wherein said shock absorber is not accorded any damping function and is mountable to the front end of a (not explicitly shown) supporting structure as a modular unit. FIG. 2 shows a side sectional view of the shock absorber according to the first embodiment. FIG. 5 shows a detail sectional depiction of the deformation tube employed in the shock absorber 100 in accordance with the first (and second) embodiment.

The shock absorber 100 in accordance with the first preferred embodiment is suitable as an irreversible shock-absorbing stage which, additionally to any given damping elements (such as e.g., side buffers) or energy-absorbing units there may be, can be mounted as one complete exchangeable modular unit to a support frame or the undercarriage of, for example, a railcar body. To this end, the shock absorber 100 in accordance with the first embodiment comprises a base plate 1 configured as a flange which can be mounted for example with bolts to the (not explicitly shown) supporting structure. Throughholes 16 are thereby preferably provided in base plate 1 through which the bolts used to fix the shock absorber 100 can be guided.

The shock absorber 100 according to the first embodiment includes a support frame 2 which is fixedly connected to the base plate 1. In detail, the support frame 2 of the embodiment depicted is configured as a tube section of circular cross-section. A deformation tube 5 is arranged inside said support frame 2. The end of said deformation tube 5 facing the supporting structure thereby abuts against the base plate 1 and is fixed there, for example by the groove 18 indicated in FIG. 7.

The shock absorber 100 further includes a force-transferring element 3 in the form of a tubular body, wherein the end of said force-transferring element 3 opposite base plate 1 is fixed to an impact plate 11. The base plate-side end of the force-transferring element 3 it fixedly coupled to a tensioning element 4.

The tensioning element 4 of the embodiment as depicted is a component configured separately from the force-transferring element 3, and includes a tensioning element body 4a and an integrally-formed stage 4b on said tensioning element body 4a. The tensioning element body 4a extends at least partly into the interior of the force-transferring element 3 facing the base plate 1, while stage 4b of the tensioning element protrudes over the front end of the end of said force-transferring element 3 facing the base plate 1. The fixed connection stipulated between the force-transferring element 3 and the tensioning element 4 is preferably formed by a material-fit connection between the tensioning element body 4a and the interior of the force-transferring element 3.

The force-transferring element 3 with the tensioning element 4 fixedly connected at the base plate-end side is held to the support frame 2 of shock absorber 100 by a connecting element 6. To this end, the connecting element 6 includes a stop surface 10 (cf. FIG. 5) to which abuts the side of the stage 4b configured on the tensioning element body 4 opposite the base plate 1.

On the other side, the tensioning element 4 receives a conical ring 9, wherein said conical ring 9 serves to brace the deformation tube 5 between the base plate 1 and the force-transferring element 3 to the tensioning element 4 provided on the base plate-side end. Although the figures show the tensioning element 4, the conical ring 9 and the force-transferring element 3 each as an individually-configured component, it is of course also conceivable for these elements (tensioning element 4, conical ring 9, force-transferring element 3) or at least some of these elements to be of integral configuration.

As can be seen particularly from FIG. 5, which shows a detail view of the shock absorber 100 depicted in FIG. 2, the end of the deformation tube 5 opposite the base plate 1 is received in a groove 6a configured in connecting element 6. The connecting element 6 itself is detachably connected to the support frame 2 by a screw fitting 15. In the depicted connected state of connecting element 6, the stop surface 10 presses the connecting element 6 against stage 4b of the tensioning element 4, wherein this compressive force (preload) is transferred through the conical ring 9 to the end of the deformation tube 5 facing the force-transferring element 3.

The end of the deformation tube 5 facing the force-transferring element 3. 3 exhibits a wider cross-section compared to a section situated closer to the base plate. The conical ring 9 together with the stage 4b formed on tensioning element 4 extends at least partly into this expanded cross-section of the deformation tube 5 such that the conical ring 9 rests against the inner surface of said expanded deformation tube section. As indicated above, the conical ring 9 thus assumes a guiding function for the longitudinal displacement of the force-transferring element 3 toward base plate 1 as effected upon the activation of the shock absorber 100.

A further guiding function is accorded the guide surface 7 provided on connecting element 6 which rests against the outer surface 8 of force-transferring element 3.

The embodiment of the inventive shock absorber 100 depicted in FIGS. 1 and 2 serves in plastically absorbing energy upon a crash, wherein this absorption of energy ensues at a constant force level. The activation force and the force level can be regulated by the degree of predeformation to deformation tube 5 at its end opposite the base plate 1 and the wall thickness to said deformation tube 5. When, upon a crash; i.e., after exceeding the activation force characteristic for deformation tube 5 for transferring impact force, the force-transferring element 3 with the tensioning element 4 disposed on its base plate-side end and the conical ring 9 moves into the deformation tube 5, whereby the deformation tube 5 plastically deforms by cross-sectional expansion. The energy absorption attainable with the shock absorber 100 is exhausted when the force-transferring element 3 with the tensioning element 4 disposed on its base plate-side end and the conical ring 9 strikes against base plate 1.

According to the present invention, only the plastically-deformed deformation tube 5 needs to be replaced after a crash has occurred, while the rest of the shock absorber 100 can still continue to be used. In order to facilitate replacement of the deformation tube 5, the connecting element 6 is preferably connected to the support frame 2 by a screw fitting 15.

Figure 3:
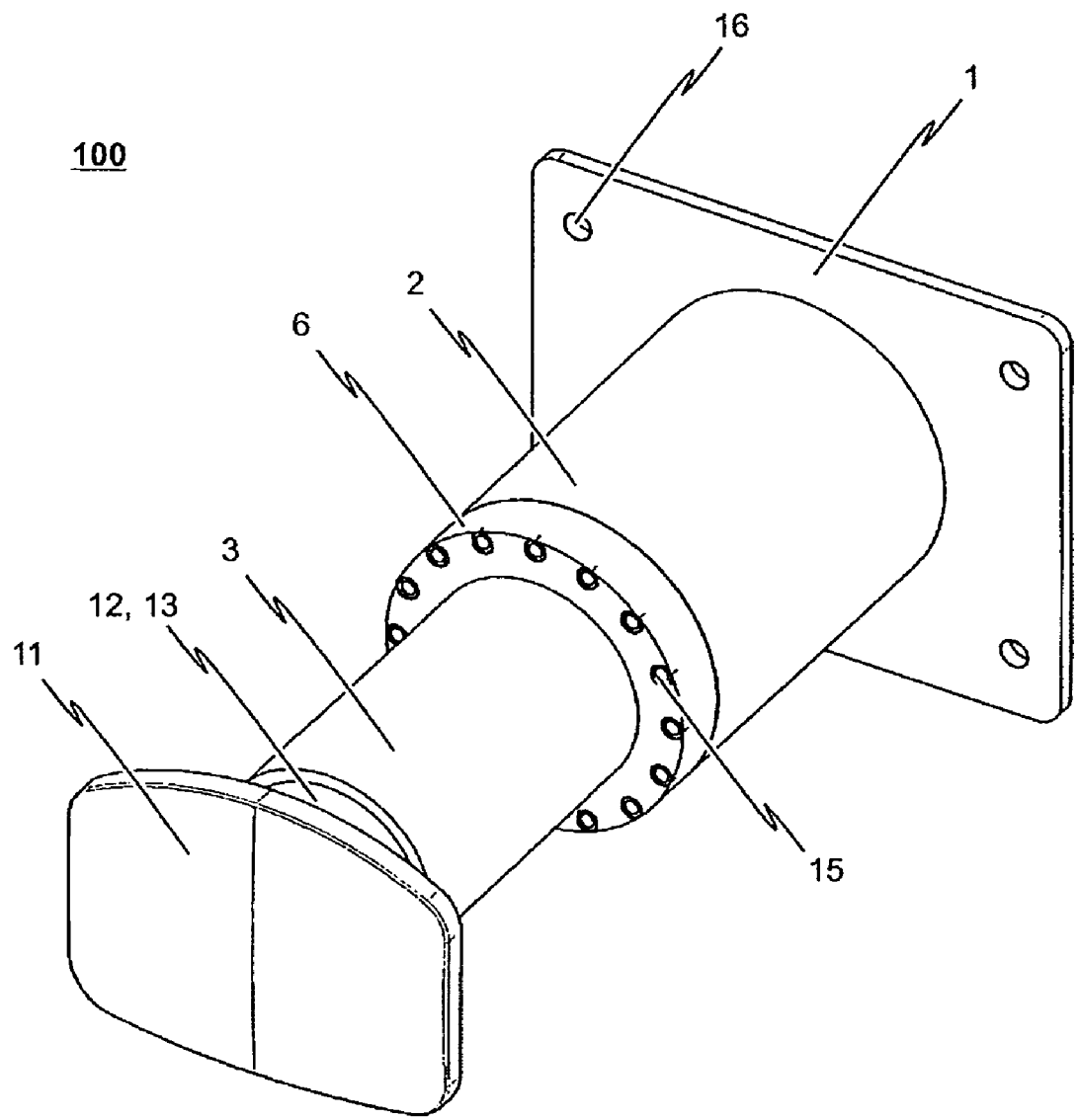
FIG. 3 is a shock absorber in accordance with a second embodiment of the invention, wherein the shock absorber is accorded a damping function and is mountable to the front end of a supporting structure as a modular unit.
Figure 4:
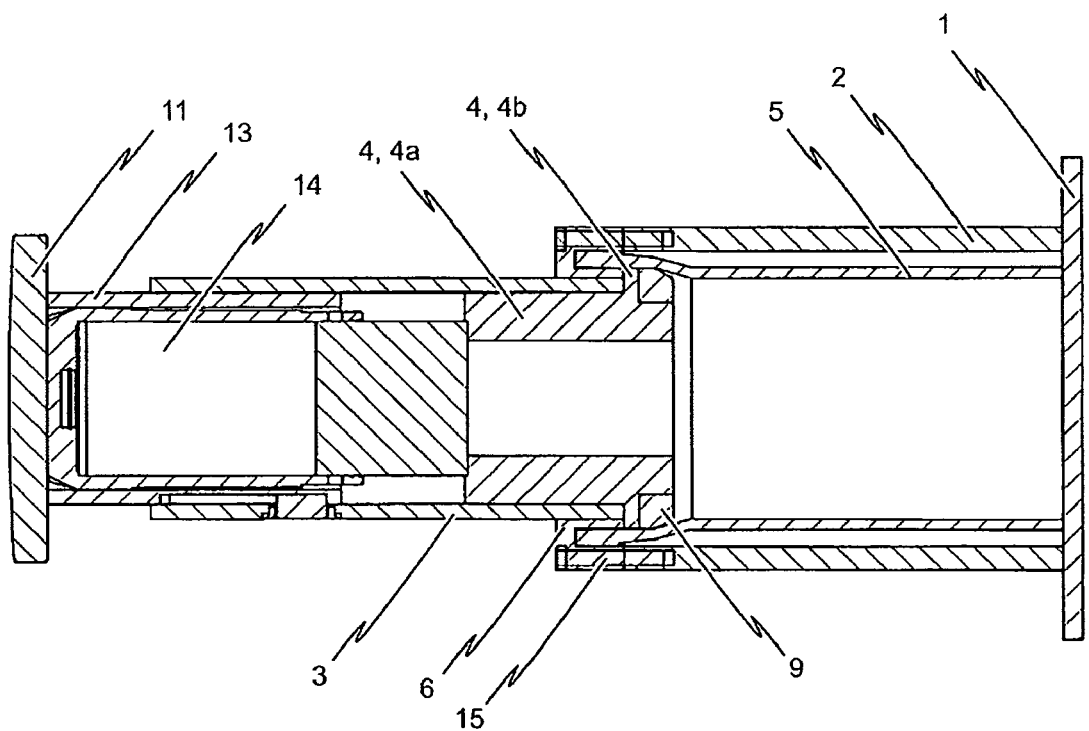
FIG. 4 is a side sectional view of the shock absorber according to FIG. 3.

FIG. 3 is a perspective view of a second embodiment of the inventive shock absorber 100. FIG. 4 shows a side sectional view of the shock absorber 100 depicted in FIG. 3. Details of the deformation tube 5 employed in the shock absorber 100 according to the second embodiment are provided in FIG. 5.

As with the shock absorber depicted in FIGS. 1 and 2, the shock absorber according to FIG. 3 is also suited to being mounted as a complete exchangeable functional group to the front end of a supporting structure. However, in contrast to the first embodiment described above with reference to FIGS. 1 and 2, the second embodiment exhibits, as shown in FIGS. 3 and 4, an additional damping function. To this end, a buffer device 12 is integrated into the force-transferring element 3. As FIG. 4 shows, the buffer device 12 essentially includes a buffer plunger 13, wherein the impact plate 11 is disposed on the end of said buffer plunger 13 opposite the base plate 1. The buffer plunger 13 extends at least partly into the force-transferring element 3 configured as a hollow body and is guided through the inner wall of said force-transferring element 3 in the axial direction.

The buffer device 12 can further include a preferably regeneratively-designed energy-absorbing element 14 (e.g., an elastomer body) accommodated inside said force-transferring element 3 which serves to absorb and thus, dampen moderate impact forces. The term "moderate impact forces" refers to impact forces which occur during normal vehicle operation, for example, and are introduced to impact plate 11.

After the operating load for the preferably regeneratively-designed energy-absorbing element 14 of the buffer device 12 accommodated within force-transferring element 3 has been exceeded, the impact plate 11 strikes against the end of the force-transferring element 3 opposite the base plate 1, in consequence of which the force flow resulting from an impact is transferred directly from the impact plate 11 to the force-transferring element 3. As the process continues, the force flow resulting from a transfer of impact force is thus, guided through the force-transferring element 3, the tensioning element 4, stage 4b of tensioning element 4 respectively, the deformation tube 5 and the base plate 1.

The deformation tube 5 represents a substantially rigid connection up to a predefinable characteristic impact force.

After the impact force characteristic for the deformation tube 5 has been exceeded, however, said deformation tube 5 loses its force-transferring function, whereby at least a portion of the energy occurring in the transferring of the impact force is converted into the work of deformation and heat and thus, dissipated by the simultaneous plastic deformation of said deformation tube 5. The plastic deformation of deformation tube 5 effects the movement of the force-transferring element 3 relative base plate 1 toward said base plate 1.

The characteristic impact force to activate deformation tube 5 should be selected for the inventive shock absorber 100 such that the plastic deformation of deformation tube 5 does occur not until after the energy absorbance afforded by energy-absorbing element 14 of buffer device 12 has been exhausted.

The second embodiment of the inventive shock absorber 100 provides a complete exchangeable module which can be mounted for example to a supporting structure for a railcar body. This is thus, a shock absorber which, due to the integration of the buffer device 12, also exhibits effective damping properties during normal vehicle operation. The buffer device integrated in shock absorber 100 can for example, serve as a regeneratively-designed shock absorber, in which the impact forces occurring for example between the individual car bodies of a multi-member vehicle during normal operation of the vehicle can be absorbed or damped. When the operating load of the regeneratively-designed damping element 14 of buffer device 12 integrated in shock absorber 100 is exceeded, however, the energy-absorbing unit (deformation tube 5) of the shock absorber 100 downstream the buffer device 12 is activated, whereby the impact energy is converted into the work of deformation and heat by a defined plastic deformation of said deformation tube 5. Thus, the regeneratively-designed damping element 14 of buffer device 12 as well as the other components of shock absorber 100 can be effectively protected against destruction or damage upon a crash. In fact, subsequent activation of shock absorber 100, only the deformation tube 5 needs to be replaced.

Figure 6:
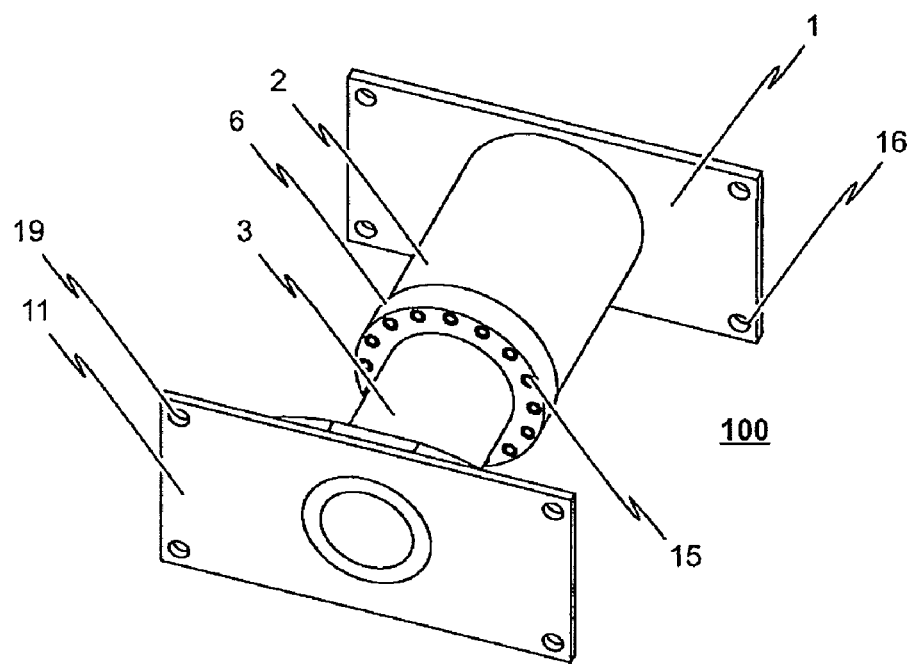
FIG. 6 is a first three-dimensional side view of a shock absorber in accordance with a third embodiment of the invention.
Figure 7:
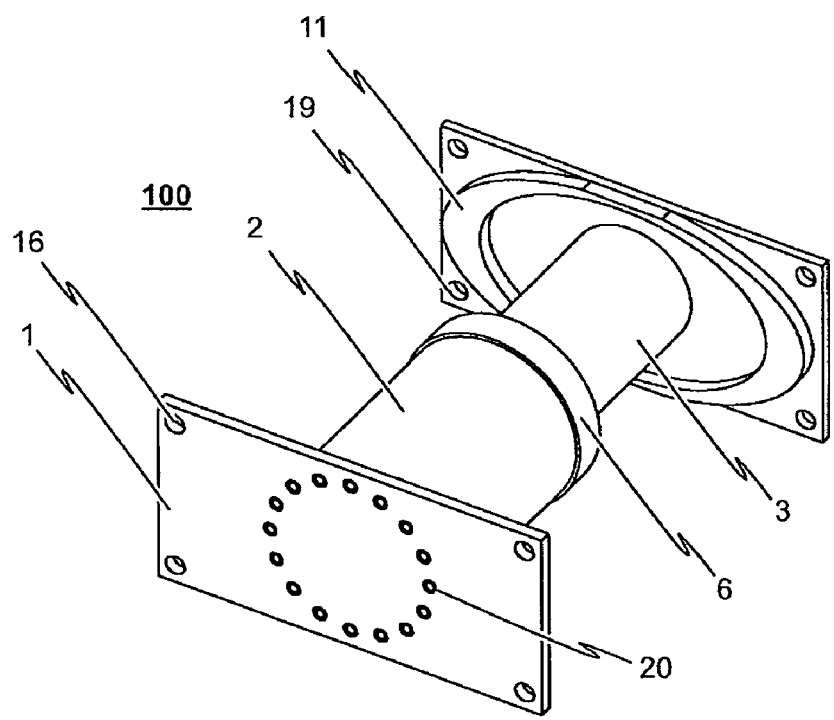
FIG. 7 is a three-dimensional side view of the base plate of the shock absorber depicted in FIG. 6.
Figure 8:
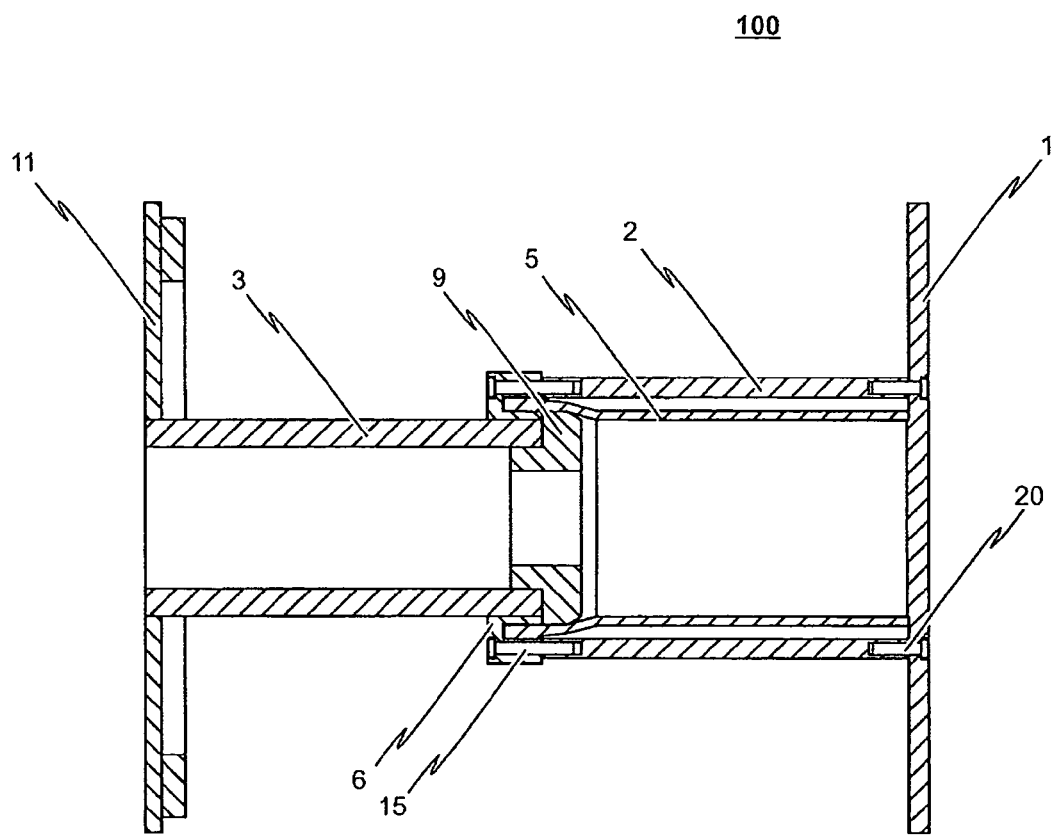
FIG. 8 is a side sectional view of the shock absorber according to FIG. 6 or FIG. 7.
Figure 9:
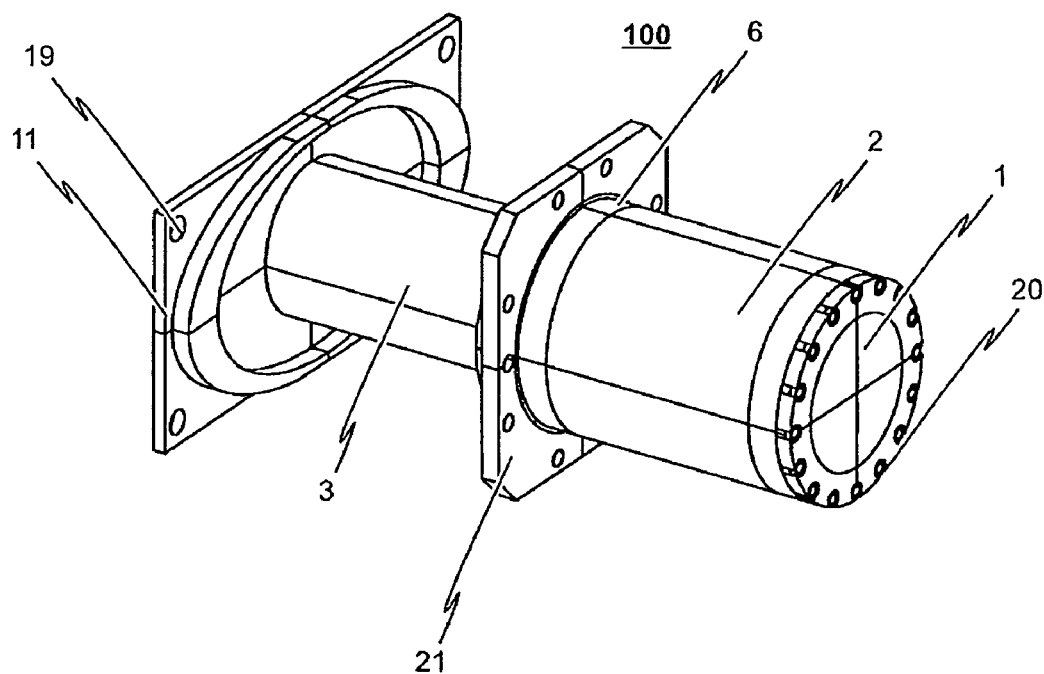
FIG. 9 is a first three-dimensional side view of a shock absorber in accordance with a fourth embodiment of the invention.
Figure 10:
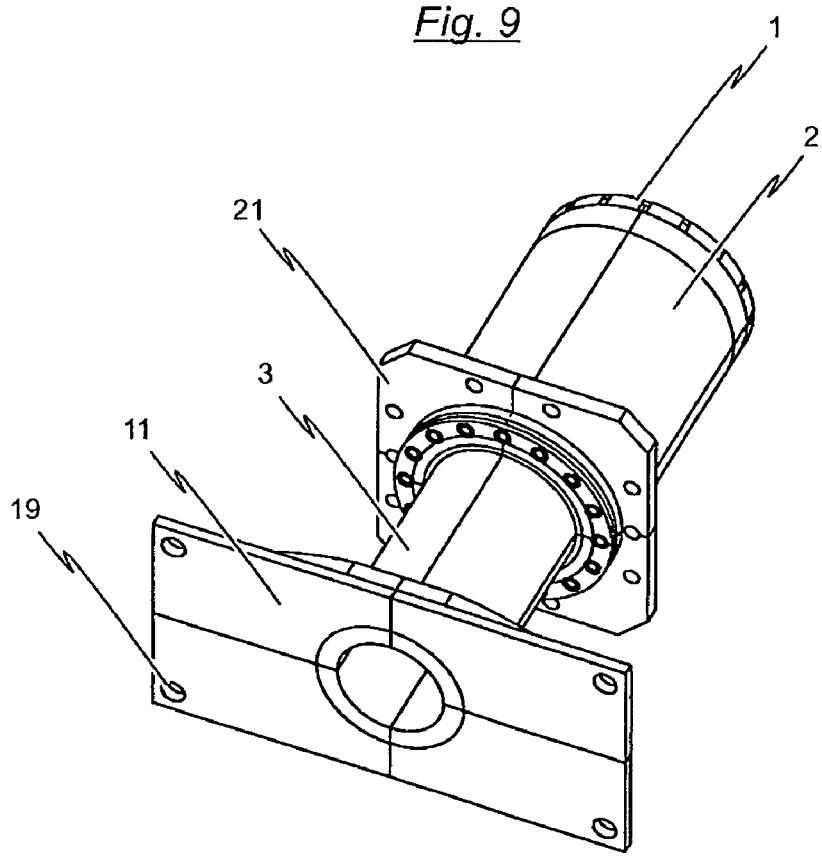
FIG. 10 is a second three-dimensional view of the shock absorber according to FIG. 9.

FIGS. 6 and 7 each show a three-dimensional side view of a shock absorber 100 in accordance with a third embodiment of the present invention. FIG. 8 depicts a side sectional view of the shock absorber 100 in accordance with said third embodiment.

In the structural and functional sense, the third embodiment of the inventive shock absorber 100 is in principle comparable to the first embodiment according to the FIG. 1 and FIG. 2 representations. Briefly summarized, the third embodiment relates to a shock absorber for the plastic absorption of energy in a crash which employs a deformation tube 5 which expands by plastic deformation after shock absorber 100 has been activated. In contrast to the first embodiment described with reference to the representations of FIGS. 1 and 2, the shock absorber 100 according to the third embodiment serves as a force-transferring component, serving for example between a supporting structure such as the main frame of a railcar body (not explicitly shown in FIGS. 6 to 8) and a component upstream said supporting structure.

To this end, the shock absorber 100 according to the third embodiment includes a base plate 1, by which the shock absorber 100 can be detachably affixed to the supporting structure. Conceivable hereto would be for example providing throughholes 16 in base plate 1 to receive screws, pins, bolts, etc. ultimately serving to fix the base plate 1 to the supporting structure.

Instead of throughholes 16, however, other solutions would also be conceivable as fixing means or mechanism. For example, if due to structural design contingencies, base plate 1 can only be provided with a relatively small edge area in which there would not be enough space for the appropriate throughholes 16, respectively insufficient space for screws, bolts, etc. to be received in the throughholes 16, it would be suitable to weld or otherwise affix a nipple or the like to the rear side of base plate 1; i.e. the side of base plate 1 faced away from the support frame 2, wherein only this nipple serves to fix the shock absorber 100 to the supporting structure.

In contrast to the first embodiment, the impact plate 11 in the third embodiment of the present invention is likewise configured as a base plate to which a component upstream the supporting structure can be affixed. As with base plate 1, it is hereby likewise conceivable for the impact plate 11 configured as a base plate to exhibit throughholes 19 through which the appropriate fixing elements can be guided so as to fix a component upstream the supporting structure by means of said fixing elements.

The following will make reference to the side view depicted in FIG. 8 in describing the functioning of a shock absorber 100 designed in accordance with the third embodiment.

The shock absorber 100 according to the third embodiment includes the above-cited base plate 1 as well as the impact plate 11 as likewise cited above such that the shock absorber 100 can serve as a connecting piece in the connecting of the supporting structure to an upstream component. A support frame 2 is preferably detachably fixed to the base plate 1. The appropriate screw fittings 20 serve this purpose in the embodiment depicted in FIG. 8. As also in the first embodiment, the support frame 2 is configured as a tube section of circular cross-section. A deformation tube 5 is arranged inside support frame 2, its end facing the supporting structure abutting against the base plate 1 and fixed there, for example by a groove. The opposite end of the deformation tube 5 exhibits an expanded cross-section held in a tensioning element 4. Said tensioning element 4 is a component including a tensioning element body 4a and a stage 4b integrally formed on said tensioning element body 4a. The tensioning element body 4a extends at least partly into the interior of a force-transferring element 3 facing the base plate 1, while stage 4b of the tensioning element protrudes over the front end of the end of the force-transferring element 3 facing the base plate 1. The force-transferring element 3 with the tensioning element 4 fixedly connected at the base plate-side end is held to the supporting structure 2 of shock absorber 100 by a connecting element 6. To this end, the connecting element 6 includes a stop surface 10 against which the side of the stage 4b formed on tensioning element body 4a opposite base plate 1 strikes.

On the other side, the tensioning element 4 receives a conical ring 9, wherein said conical ring 9 serves to brace the deformation tube 5 between the base plate 1 and the force-transferring element 3 with the tensioning element 4 disposed on the base plate-side end.

The design of shock absorber 100 results in the force flow occurring when impact force is transferred between the flange-configured impact plate 11 and the base plate 1 running via the force-transferring element 3 to the connecting element 6, whereby the force flow is split by the connecting element 6 and a first portion runs via the support frame 2 to the base plate 1 while parallel thereto, a second portion runs from the conical ring 9 to the deformation tube 5 and from there to the base plate 1. When this second portion of the force guided through the deformation tube 5 during a transfer of impact force exceeds a predefined or predefinable value, a plastic deformation of the deformation tube 5 occurs by simultaneous cross-sectional expansion, whereby at least a portion of the energy transferred from the flange-configured impact plate 11 to the base plate 1 is converted into heat, the work of deformation respectively, and thus, dissipated. Upon the activation of shock absorber 100, a relative movement occurs between the base plate 1 and the flange-configured impact plate 11, wherein the force-transferring element 3 together with the conical ring 9 moves into the deformation tube 5.

The activation force and the force level for shock absorber 100 can be regulated by the degree of predeformation and the wall thickness of deformation tube 5. The essential point is that subsequent the activation of shock absorber 100, only the deformation tube 5 needs to be replaced while the remaining components of shock absorber 100 can still continue to be used.

At this point, the dual function fulfilled by connecting element 6 moreover needs to be emphasized. On the one hand, the connecting element 6 serves—as clarified above—to receive the already-expanded end section of the deformation tube 5 and to brace same to base plate 1 via the support frame 2. On the other hand, as can be clearly seen in the depictions according to FIGS. 2, 5 and 8, the connecting element 6 includes a guide surface 6b on which the outer surface of the force-transferring element 3, and thus, the relative motion of the force-transferring element to the deformation tube 5, is guided upon activation of shock absorber 100.

Figure 11:
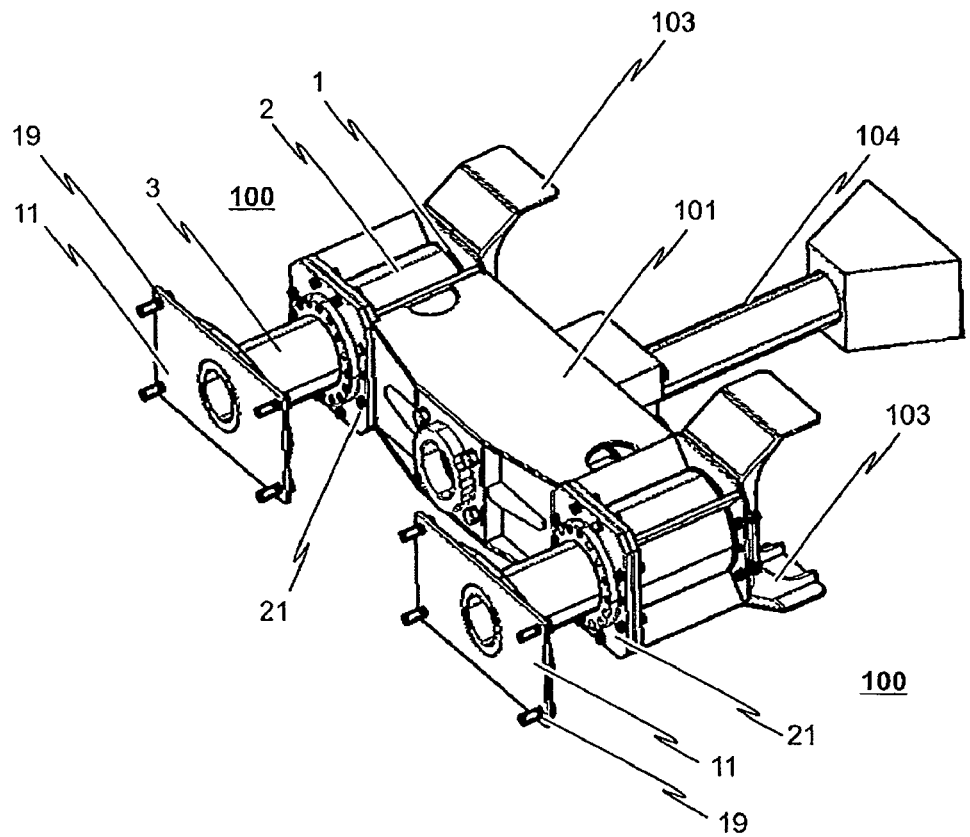
FIG. 11 is the shock absorber according to FIG. 9 or FIG. 10 integrating a crossbeam running for example in front of the front end of a supporting structure.
Figure 12:
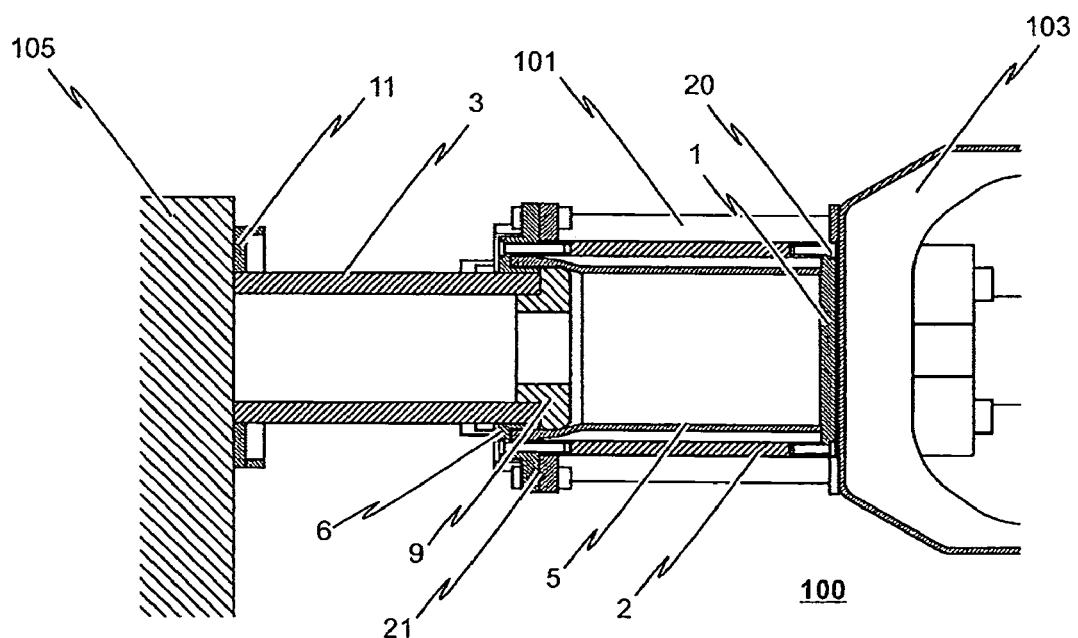
FIG. 12 is a side sectional view of the shock absorber depicted in FIG. 11.

FIGS. 9 to 12 depict a fourth embodiment of the inventive shock absorber 100. Specifically, FIGS. 9 and 10 each show the fourth embodiment of shock absorber 100 in a three-dimensional perspective view. FIG. 11 shows a preferred use of the shock absorber 100 depicted in FIGS. 9 and 10, while FIG. 12 shows a side sectional view of the shock absorber 100 employed in the depiction according to FIG. 11.

In the structural regard, the fourth embodiment of the inventive shock absorber 100 is comparable to the previously-described embodiments. However, in contrast to e.g., the third embodiment, the base plate 1 to which the support frame 2 is connected by means of bolts 20, is not configured as a flange by means of which the shock absorber 100 can be affixed e.g., to a railcar body or an upstream component. Instead, the fourth embodiment provides for a flange 21 at the transition region between the support frame 2 and the force-transferring element 3. This design permits the shock absorber 100 to be used as a module and be integrated for example in a crossbeam 101. This can be seen from the representations as shown in accordance with FIGS. 11 and 12.

In the embodiment depicted in FIG. 11, the module-configured shock absorber 100 can be fixed to the supporting structure via the flange-configured impact plate 11, while the support frame 2 of the shock absorber 100 configured as a circular tube section is integrated in a crossbeam 101 running in front of the front end of the supporting structure. In detail, the shock absorber 100 is thereby coupled to the crossbeam 101 by means of the flange 21.

As needed, a climbing guard 103 as well as a coupling 104 can for example, be disposed on crossbeam 101—as can be seen in the FIG. 11 representation. In a crash, the shock absorber 100 partly integrated into crossbeam 101 and serving for example as the connecting element to the car body serves in the plastic absorption of energy at a constant force level. For this purpose, the impact plate 11 of the shock absorber 100 is fixed to a (not shown) car body. Upon a crash, energy is first absorbed reversibly and irreversibly by a buffer/drawgear mechanism of the coupling 104 mounted (bolted) to the crossbeam. The shock absorber 100 comes into operation thereafter. As also in the previously-described embodiments, the shock absorber 100 according to the fourth embodiment includes the base plate 1, the support frame 2, the deformation tube 5, the force-transferring element 3, the conical ring 9 with the tensioning element 4 and the connecting element 6. The absorption of energy afforded by the shock absorber 100 has already been specified with reference to the representations shown in FIGS. 1 to 8.

It is of course also conceivable, however, for the shock absorber 100 designed as a module in accordance with the fourth embodiment to also have a reversible shock-absorbing function itself, as is the case with the shock absorber 100 according to the second embodiment.

Figure 13:
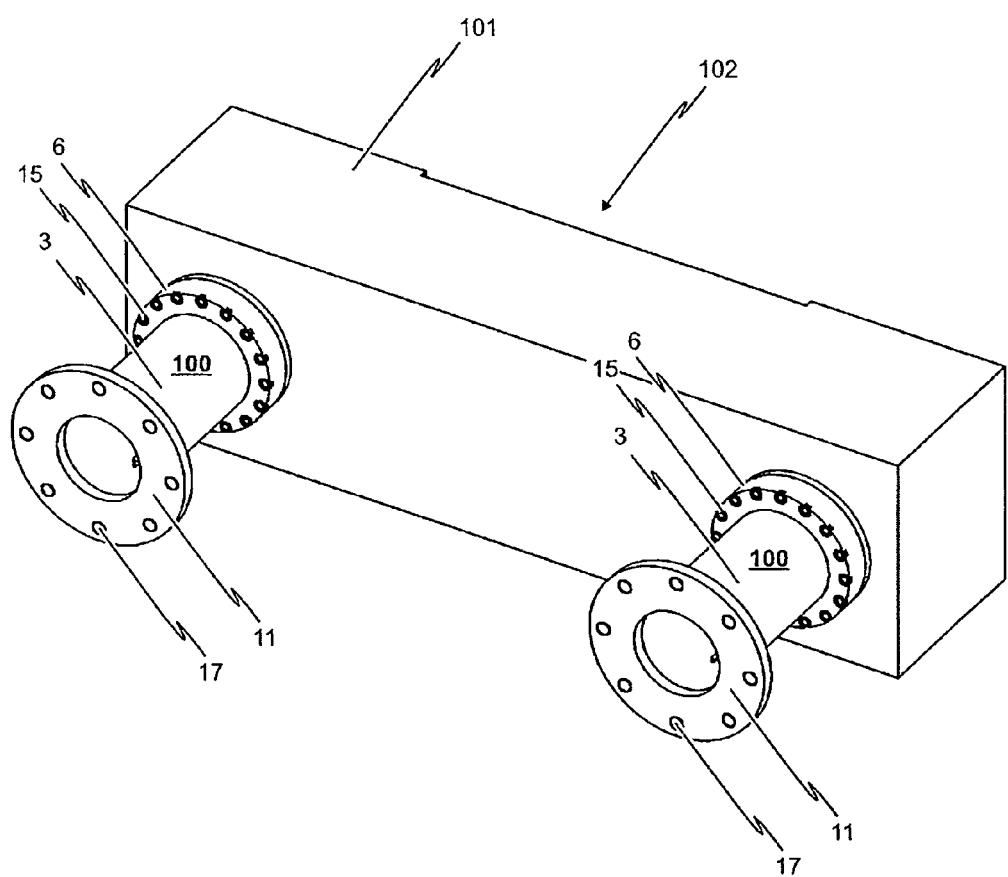
FIG. 13 is a shock absorber in accordance with a fifth embodiment of the invention, wherein the shock absorber is not accorded any damping function and is integrated in a crossbeam running in front of the front end of a supporting structure.

FIG. 13 depicts a fifth embodiment of the inventive shock absorber 100. In this embodiment, the shock absorber 100 is used to connect a support 101 running transverse to the front end of a (not shown) supporting structure to the front end of said supporting structure. In detail, and as can particularly be seen from FIG. 14, which shows a sectional view of the shock absorber 100 depicted in FIG. 13, the shock absorber 100 employed in the fifth embodiment is in principle that as has already been described with reference to FIGS. 1 and 2.

Figure 14:
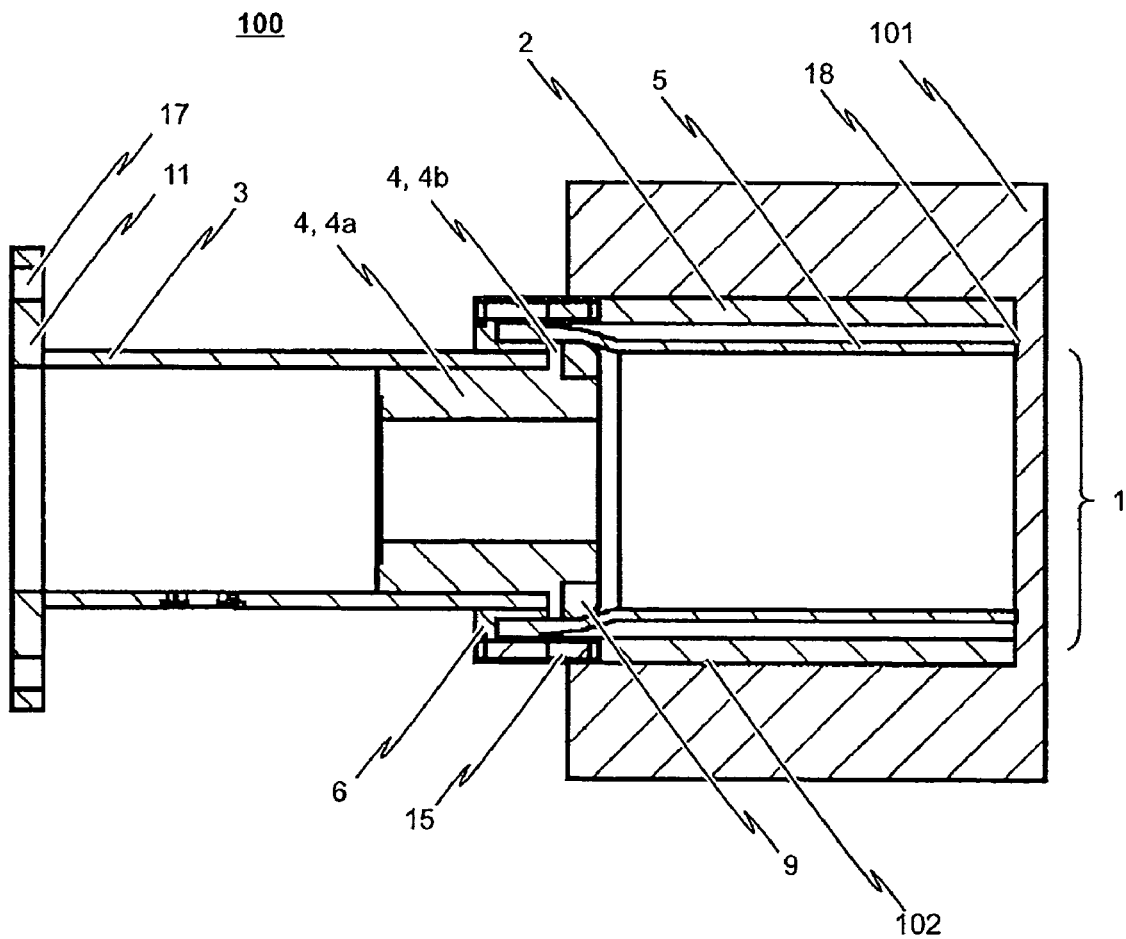
FIG. 14 is a side sectional view of the shock absorber depicted in FIG. 13.

Specifically, the shock absorber 100 according to FIG. 13 or FIG. 14 includes a force-transferring element 3, an impact plate 11 arranged on its one end. Said impact plate 11 serves to preferably detachably fix the shock absorber 100 with crossbeam 101 to a (not explicitly shown) supporting structure. The corresponding throughholes 17 are provided in the impact plate 11 to this end, serving to receive the respective bolts, etc.

The structure and functioning of the shock absorber 100 according to FIG. 14 corresponds substantially to the structure and functioning of the shock absorber 100 described above with reference to FIG. 2. However, in the fifth embodiment, the shock absorber 100 is partly integrated in the crossbeam 101. Specifically, the crossbeam 101 exhibits a recess 102 in which the support frame 2 of the shock absorber 100 is received. The connecting element 6 is—as is also the case in the first and second embodiment of the inventive shock absorber 100—detachably fixed to this support frame 2 by a screw fitting 15.

In the fifth embodiment of the inventive shock absorber 100, the base plate 1 is con-figured integrally in the crossbeam 101. In like manner, it is of course also conceivable for the support frame 2 to be configured as an integral component of the crossbeam 101.

With the shock absorber 100 according to the fifth embodiment, a shock-absorbing stage is provided with which a support 101 provided transverse to the front end of a suppor-ting structure can be connected to said supporting structure, wherein the shock absorber 100 is activated after a predefinable impact force is exceeded and the energy occurring in the transferring of impact force is at least partly converted into the work of deformation or heat energy and thus dissipated. After the shock absorber 100 has been activated, it is in turn only necessary to replace the deformation tube 5, while the remaining components of the shock absorber 100 can continue to be used further.

Figure 15:
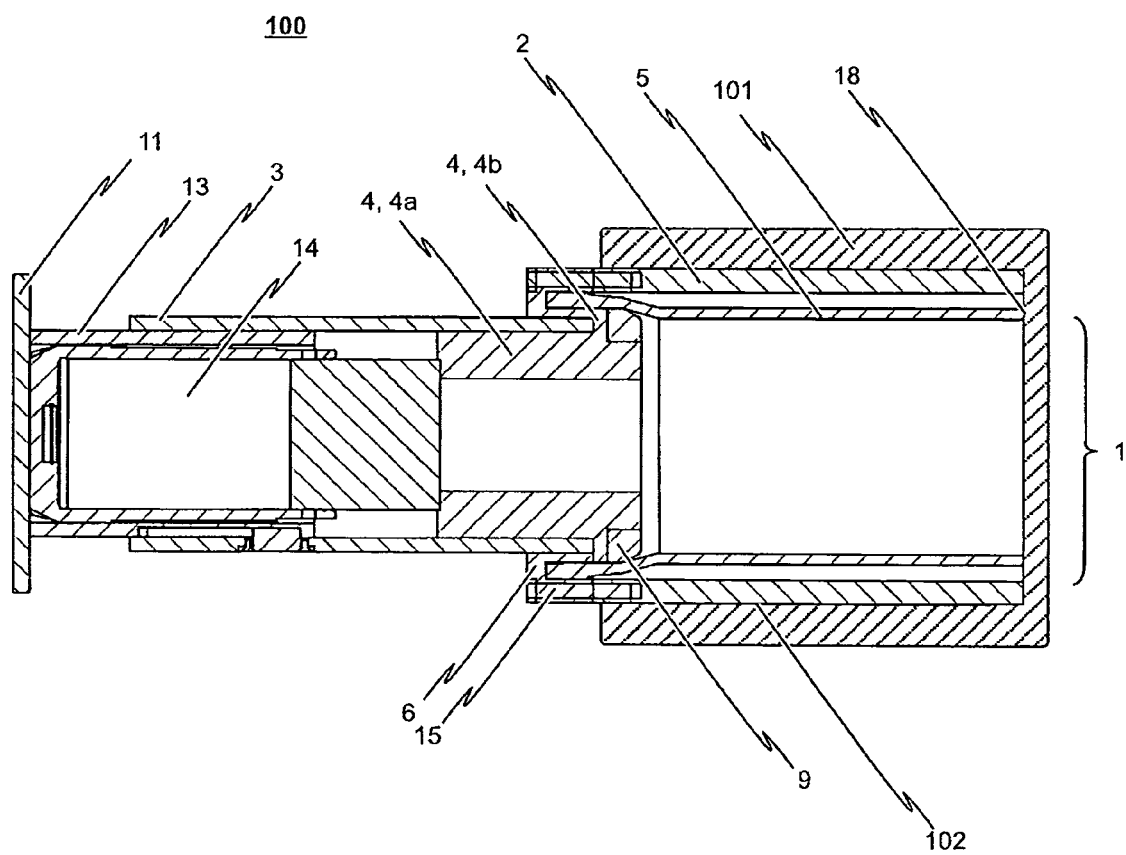
FIG. 15 is a side sectional view of a shock absorber in accordance with a sixth embodiment of the invention, wherein the shock absorber is accorded a damping function and is integrated in a crossbeam running in front of the front end of a supporting structure.

FIG. 15 depicts a further development (sixth embodiment) of the fifth embodiment of inventive shock absorber 100 described above with reference to FIGS. 13 and 14. This further development corresponds substantially to a combination of the shock absorber according to the fifth embodiment (cf. FIGS. 13 and 14) and that of the second embodiment (cf. FIGS. 3 and 4). In detail, this relates to a shock absorber 100 which serves to fix a crossbeam 101 to a front end of a (not explicitly shown) supporting structure, wherein this connection not only provides shock absorbance, but also shock dampening of moderate impacts. A buffer device 12 is thereto integrated into shock absorber 100, whereby the structure and the functioning of this buffer device is substantially comparable to the embodiment previously described with reference to FIGS. 3 and 4.

Figure 16:
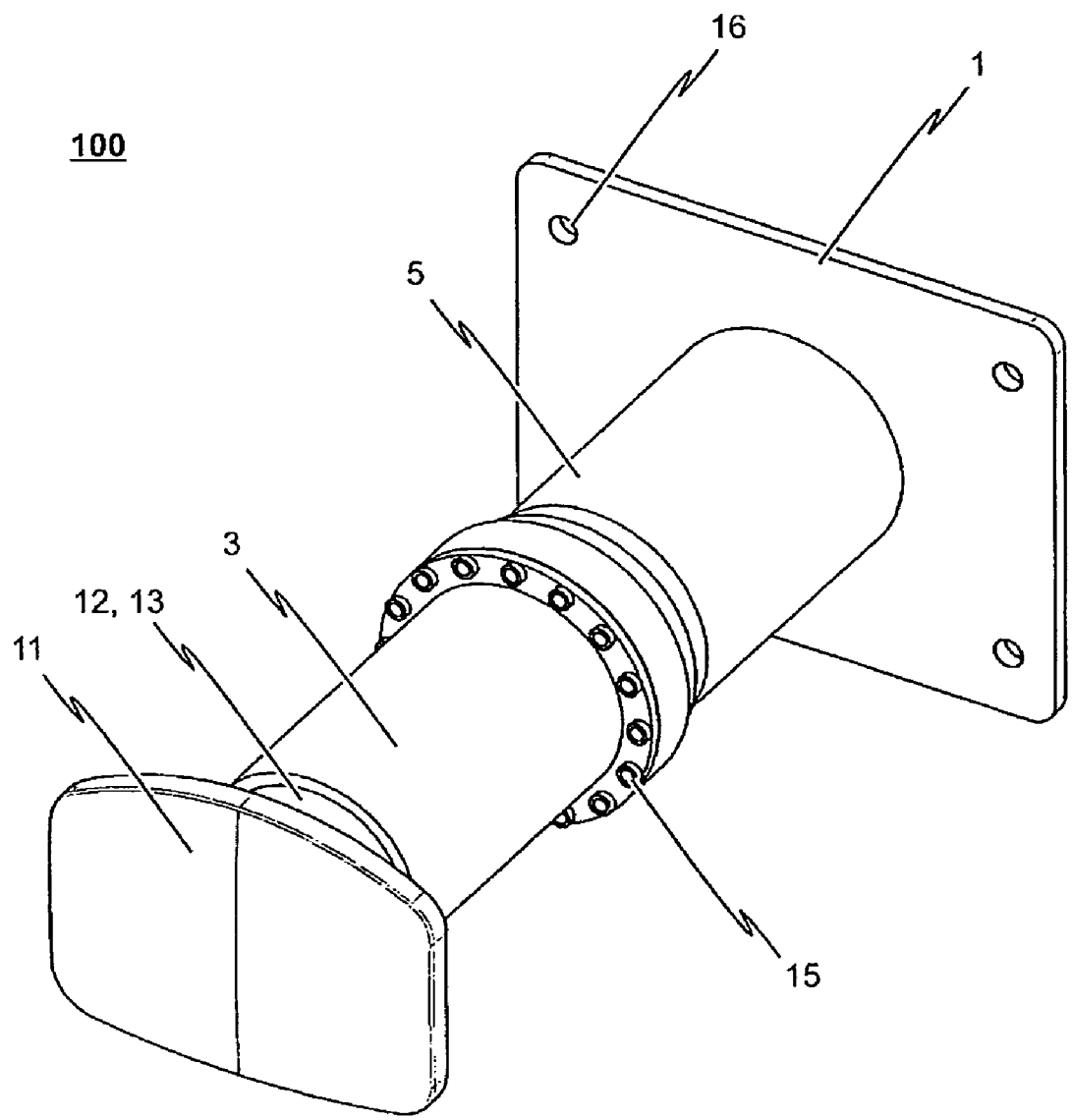
FIG. 16 is a shock absorber in accordance with a seventh embodiment of the invention, wherein the shock absorber is accorded a damping function and is mountable to the front end of a supporting structure as a modular unit.
Figure 17:
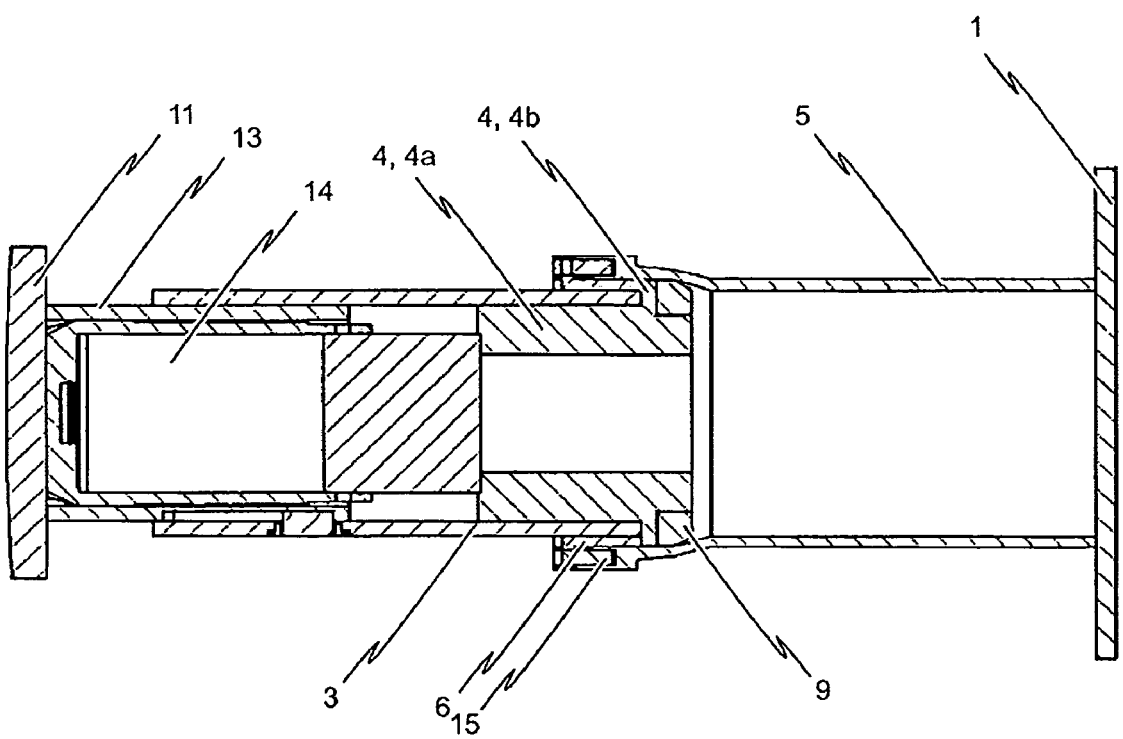
FIG. 17 is a side sectional view of the shock absorber depicted in FIG. 16.
Figure 18:
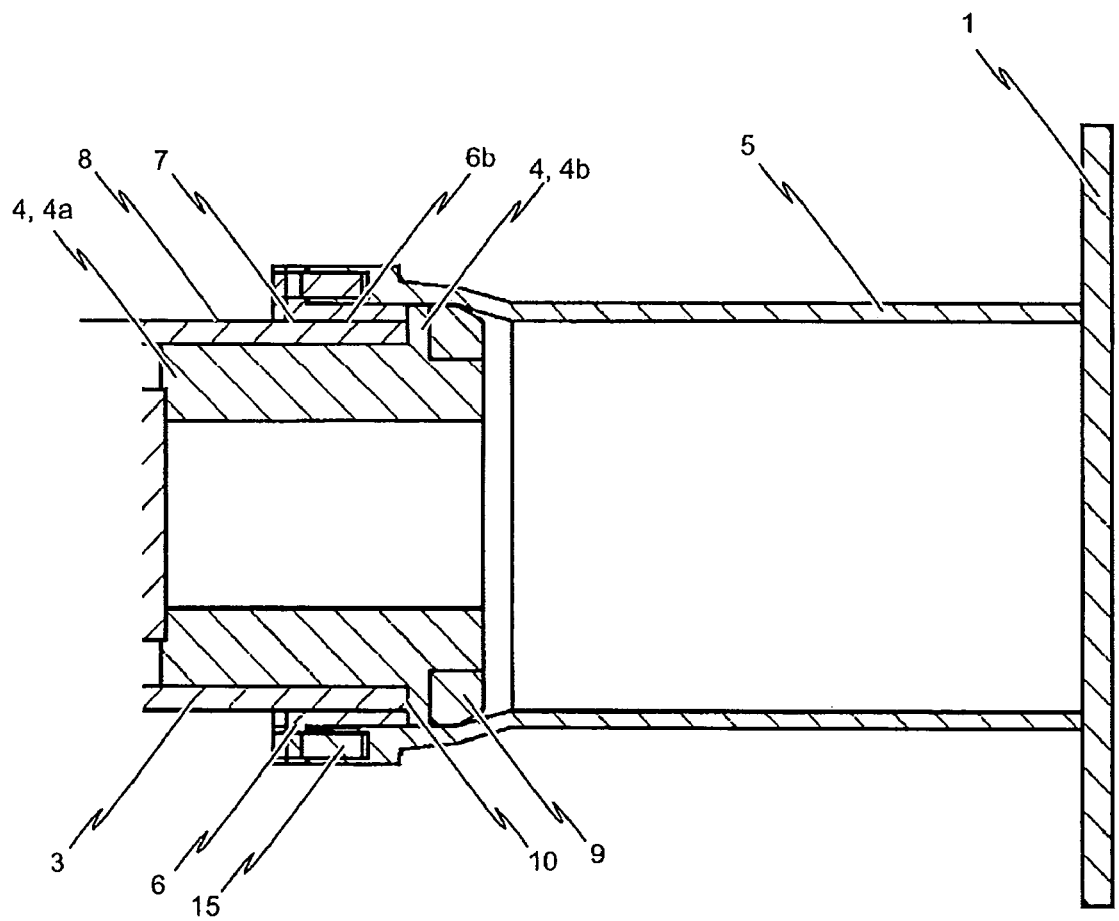
FIG. 18 is a detail sectional depiction of the deformation tube employed in the shock absorber in accordance with the seventh embodiment.

The following will make reference to the depictions of FIGS. 16, 17 and 18 in describing a seventh embodiment of the inventive shock absorber 100. FIG. 16 hereto shows a perspective view of the shock absorber 100 according to the seventh embodiment. FIG. 17 shows a side sectional view of the shock absorber 100 depicted in FIG. 16. Details of the deformation tube 5 employed in the shock absorber 100 according to the seventh embodiment can be seen in FIG. 18.

The shock absorber 100 according to the seventh embodiment is structurally and functionally comparable to the principle of the second embodiment previously described with reference to the FIGS. 3 to 5 representations. As is also the case with the second embodiment (cf. FIGS. 3 to 5), the shock absorber 100 according to the seventh embodiment has an additional damping function which is realizable with a buffer device 12 integrated in a force-transferring element 3. The mode of operation of the buffer device 12 has already been defined in conjunction with the accounting of the second embodiment.

In contrast to the second embodiment, however, the shock absorber according to the seventh embodiment is not provided with a support frame in which a deformation tube 5 is accommodated. Instead, the shock absorber 100 according to the seventh embodiment only includes—apart from the above-cited buffer device 12—a base plate 1, a deformation tube 5, a connecting element 6, a conical ring 9, a tensioning element 4, a force-transferring element 3 in which the buffer device 12 is integrated, and screw fitting elements 15.

The deformation tube 5 is fixed to the base plate 1 at its first end section facing a (not shown) supporting structure. The connecting element 6 is connected by means of the screw fitting elements 15 to the second end section of deformation tube 5 and includes a guide surface 6b on which the outer surface of the force-transferring element 3, and thus, the relative movement of said force-transferring element 3 to the deformation tube 5, is guided upon activation of the shock absorber 100. The tensioning element 4 serves to receive the conical ring 9. The bracing of the connecting element 6 to the deformation tube 5 by the screw fitting elements 15 presses the connecting element 6 to the tensioning element 4. In this way, the tensioning element 4 is braced to the deformation tube 5 via the conical ring 9. As previously indicated, upon activation of the shock absorber 100, the force-transferring element 3 is guided on the guide surface 6b of the connecting element 6 and transfers the force to the tensioning element 4.

The interacting of the individual components as well as the shock absorber's mode of operation are comparable to the previously described embodiments. In particular, the characteristic force and the force level of shock absorber 100 can also be regulated in the seventh embodiment by the degree of predeformation and wall thickness to the deformation tube 5. After the shock absorber 100 has been activated, only the deformation tube 5, with base plate 1 should the need arise, needs to be replaced anew. The rest of shock absorber 100 can continue to be used further.

The invention is not limited to the embodiments depicted in the figures; in fact other combinations of all the individual features as described are also conceivable.

The invention claimed is:
1. A shock absorber comprising:
a base plate;
a force-transferring element having a tensioning element;
an energy-absorbing element in the form of a deformation tube which is connected by a first end section to the base plate; and
a connecting element for disengageable connecting of the force-transferring element to a second end section of the deformation tube,
wherein the connecting element is pressed against the tensioning element such that the deformation tube is braced between the tensioning element and the base plate without play, and
wherein an end of the deformation tube opposite the base plate is accommodated in a groove configured in the connecting element.

2. The shock absorber according to claim 1,
wherein the shock absorber is designed to transfer impact forces;
wherein a force flow occurring upon a transfer of impact forces runs through the force-transferring element, the tensioning element, the deformation tube and the base plate;
wherein the deformation tube is designed to transfer energy ensuing from the transfer of impact force up to a predefinable characteristic impact force; and
wherein the deformation tube is further designed to absorb and dissipate at least a portion of the energy ensuing from the transfer of impact force by simultaneous plastic deformation once the predefinable characteristic impact force has been exceeded, wherein during the plastic deformation of the deformation tube, the force-transferring element and the base plate realize a relative movement toward one another.

3. The shock absorber according to claim 1,
wherein the connecting element comprises a guide surface which directly adjoins or abuts the outer surface of the force-transferring element and which is designed to guide movement of the force-transferring element relative the base plate in an axial direction of the shock absorber effected by a plastic deformation of the deformation tube after the shock absorber has been activated.

4. The shock absorber according to claim 1, further comprising:
a conical ring situated between the tensioning element and the deformation tube such that the deformation tube is braced by the conical ring between the tensioning element and the base plate.

5. The shock absorber according to claim 1, wherein the tensioning element is configured as an integral component of the force-transferring element in a form of a conterminous stage on one of stop surfaces of the connecting element facing the base plate.

6. The shock absorber according to claim 1, wherein the tensioning element comprises a body at least partly accommodated in the force-transferring element configured as a hollow body, and wherein a conterminous stage is configured on one of stop surfaces of the connecting element facing the base plate on the body of tensioning element.

7. The shock absorber according to claim 1, wherein the force-transferring element comprises an impact plate on its side opposite the base plate, by which impact forces can be introduced to the force-transferring element and the shock absorber.

8. The shock absorber according to claim 7,
wherein the shock absorber is designed to transfer impact and tractive forces, wherein a force flow occurring upon a transfer of tractive forces runs through the impact plate, the force-transferring element, the tensioning element, the connecting element and the support frame, and wherein the force flow occurring upon a transfer of impact forces runs through the impact plate, the force-transferring element, the tensioning element, the deformation tube and the base plate.

9. The shock absorber according to claim 1, wherein an integrated buffer device is provided in said shock absorber, which comprises:
   a guided buffer plunger having an impact plate in the force-transferring element at least partially configured as a hollow body; and
   a regeneratively-designed energy-absorbing element accommodated inside said force-transferring element.

10. The shock absorber according to claim 9,
   wherein the buffer device is designed to absorb or dampen up to a predefinable characteristic impact force of the impact energy resulting from force acting on the impact plate along with the simultaneous longitudinal displacement of the buffer plunger toward the base plate; and
   wherein after the absorption of energy by the energy-absorbing element of the buffer device has been exhausted, a force flow runs directly from the impact plate through the force-transferring element, the tensioning element, the deformation tube and the base plate.

11. The shock absorber according to claim 1, which further comprises:
   a support frame coupled to the base plate, wherein the deformation tube is accommodated in said support frame;
   wherein the connecting element is configured to couple the force-transferring element to the support frame on the one side and to the deformation tube on the other; and
   wherein the connecting element is disengageably coupled to the support frame and pressed against the tensioning element when in its coupled state with the support frame such that the deformation tube is braced between the tensioning element and the base plate without play.

12. The shock absorber according to claim 1, wherein the shock absorber is integrated into a crossbeam running in front of a front end of a railcar body such that the support frame is at least partly accommodated in a recess provided in said crossbeam.

13. The shock absorber according to claim 12, wherein the base plate and/or the support frame, when provided, is/are configured as an integral component of said crossbeam.

14. The shock absorber according to claim 1,
   wherein the base plate is configured as a flange which is detachably connectable to a supporting structure; and/or
   wherein the force-transferring element is detachably connectable to a supporting structure by its side opposite the base plate, by a flange.

* * * * *